(12) United States Patent
Burgess

(10) Patent No.: US 10,434,597 B1
(45) Date of Patent: Oct. 8, 2019

(54) METHODS OF FABRICATING REDUCED WEIGHT COMPONENTS

(71) Applicant: Steven P. Burgess, Shreveport, LA (US)

(72) Inventor: Steven P. Burgess, Shreveport, LA (US)

( * ) Notice: Subject to any disclaimer, the term of this patent is extended or adjusted under 35 U.S.C. 154(b) by 120 days.

(21) Appl. No.: 15/645,199

(22) Filed: Jul. 10, 2017

Related U.S. Application Data

(62) Division of application No. 14/496,033, filed on Sep. 25, 2014, now Pat. No. 9,700,957.

(51) Int. Cl.
| | |
|---|---|
| *B23K 20/00* | (2006.01) |
| *B32B 15/00* | (2006.01) |
| *B23K 20/02* | (2006.01) |
| *B23K 101/00* | (2006.01) |

(52) U.S. Cl.
CPC ...... *B23K 20/021* (2013.01); *B23K 2101/008* (2018.08); *B32B 15/00* (2013.01)

(58) Field of Classification Search
None
See application file for complete search history.

(56) References Cited

U.S. PATENT DOCUMENTS

| | | | | |
|---|---|---|---|---|
| 3,798,747 A | * | 3/1974 | Lalwaney | B23K 20/04 148/530 |
| 4,514,470 A | | 4/1985 | Rosenthal et al. | |
| 4,964,564 A | * | 10/1990 | Neal | B23P 15/04 228/107 |
| 7,157,150 B2 | | 1/2007 | Jiang et al. | |
| 2011/0176911 A1 | | 7/2011 | Couturier et al. | |
| 2013/0045334 A1 | * | 2/2013 | Seals | B23K 35/325 427/446 |

* cited by examiner

*Primary Examiner* — Devang R Patel
(74) *Attorney, Agent, or Firm* — R. Keith Harrison

(57) ABSTRACT

Methods of fabricating reduced weight components for apparatuses include obtaining a component including a relatively lightweight material; placing at least one stabilizing structure on the component; sequentially applying a plurality of applied layers on the component and the stabilizing structure by applying the relatively lightweight material over the component and applying over the relatively lightweight material a plurality of layers having gradually progressively higher proportions of the relatively heavyweight material than preceding ones of the plurality of layers closer to the component, with an outer layer of the plurality of applied layers including the relatively heavyweight material; diffusion bonding the plurality of applied layers by consolidation of the plurality of applied layers; and cutting component features in the plurality of applied layers.

19 Claims, 14 Drawing Sheets

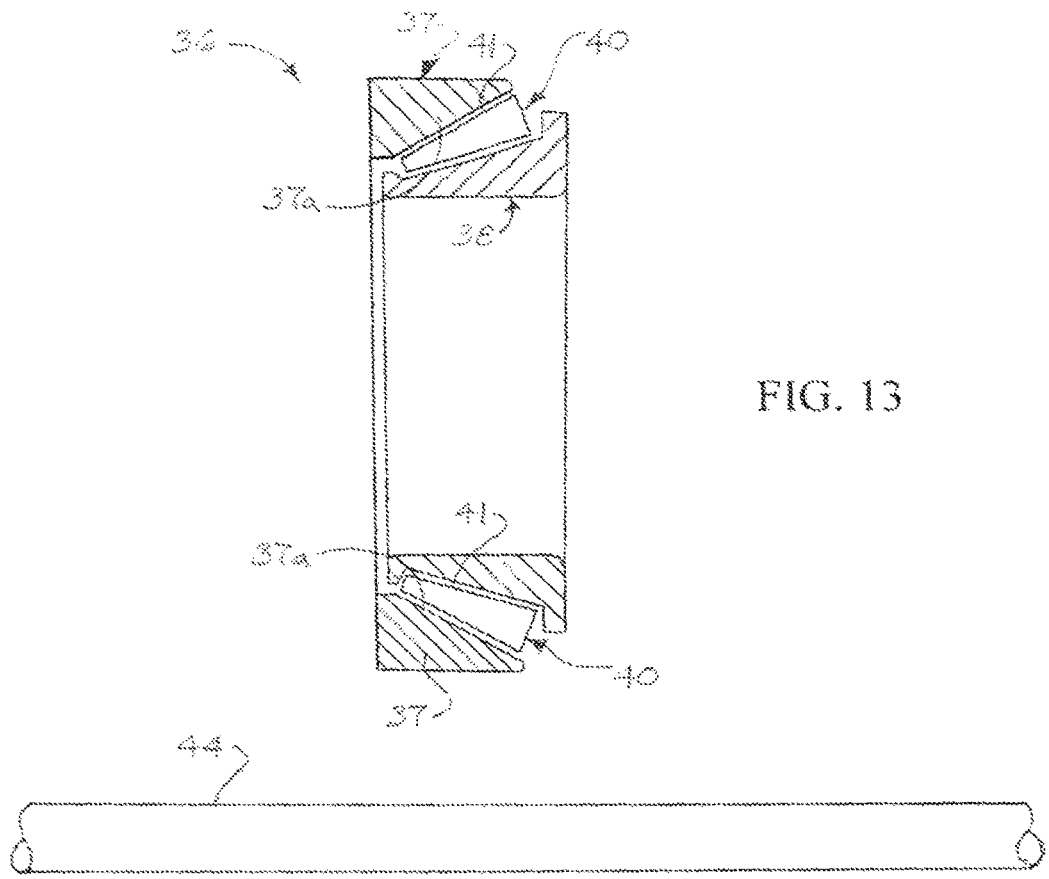
FIG. 13
FIG. 14
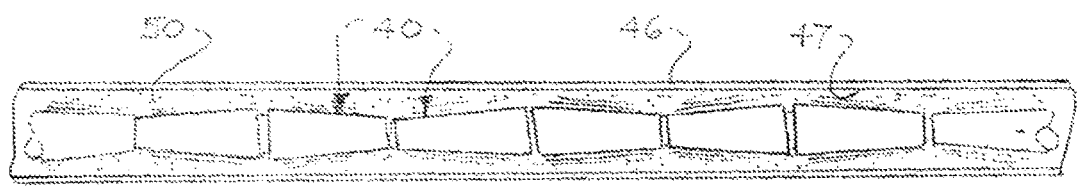
FIG. 15

METHODS OF FABRICATING REDUCED WEIGHT COMPONENTS

CROSS-REFERENCE TO RELATED APPLICATIONS

This is a divisional application of parent U.S. application Ser. No. 14/496,033, filed Sep. 25, 2014 and entitled METHODS OF FABRICATING REDUCED WEIGHT COMPONENTS, which parent application is incorporated by reference herein in its entirety.

FIELD

Illustrative embodiments of the disclosure generally relate to aircraft and racing vehicles and other apparatuses which are subject to strict weight requirements. More particularly, illustrative embodiments of the disclosure relate to methods of fabricating reduced weight components while retaining contact wear resistance of the components for apparatuses which are subject to strict weight requirements by exploiting differences in the weights of materials used to fabricate the components.

BACKGROUND

The background description provided herein is solely for the purpose of generally presenting the context of the illustrative embodiments of the disclosure. Aspects of the background description are neither expressly nor impliedly admitted as prior art against the claimed subject matter.

Aircraft and vehicles, particularly those used in military and racing applications, are frequently subjected to strict weight requirements to maximize their capability to carry personnel, equipment and ordinance, as well as compete in the sport of racing. In some of these applications, for example, reducing the weight of a helicopter by just a few pounds may contribute to the carrying capacity of the helicopter. In such applications, therefore, it may be desirable to reduce the weight of as many components as possible of the aircraft, vehicle or other apparatus in order to reduce the weight of the apparatus to within or below the mandated weight restriction guidelines.

Reduction in weight of the components in vehicles which are subject to strict weight requirements may be necessary to optimize weight, strength and wear resistance of the components, particularly components such as gears which generate and transmit power. Due to its inherent strength and high melting point, titanium may be particularly applicable as the body or core of these components due to its relatively low density. However, titanium has low contact resistance and is vulnerable to immediate wear and calling. Thus, the use of a composite including titanium and some wear-resistant material such as steel alloys which modifies the surface of the titanium may be necessary to achieve this optimization.

Combining titanium and steel may theoretically be accomplished by soldering or brazing, mechanical fastening, thermal spraying, or by some form of cladding. However, due to component shape, differential thermal expansion, type of application loading or access to the attachment process, cladding is a viable option to facilitate application of the typically steel alloy wear-resistant material to the typically titanium core of the component.

In developing a lightweight composite material which is suitable for power transmission and heavy dynamic fluctuating stresses in the components, the juncture of the steel and titanium may undergo significant stress concentrations due to the differences in crystal lattice structures, microstructures, differential thermal expansion, and differential moduli of elasticity between these materials. Moreover, brittle intermetallics may be generated with the fusing of steel and titanium. Also, the typically steel contacting surfaces of these components will be exposed to another condition new to the industry. In gear teeth mesh, full tooth surface contact is notoriously limited due to manufacturing tolerances. In such applications, it is difficult to ensure maximum surface area and evenly stress-distributed contact between gear teeth of meshing gears. By utilizing the less-rigid characteristics of titanium, it may be possible to a limited extent for mating gear teeth to better conform to each other through material deformation under load. Thus, this may require the steel surface of the gear teeth to deform and conform as well.

Accordingly, methods of fabricating reduced weight components while retaining contact wear resistance of the components, particularly power transmission components, for apparatuses which are subject to strict weight requirements by exploiting differences in the weights of materials used to fabricate the components may be desirable.

SUMMARY

Illustrative embodiments of the disclosure are generally directed to methods of fabricating reduced weight components while retaining contact, wear resistance of the components for apparatuses which are subject to strict weight requirements by exploiting differences in the weights of materials used to fabricate the components. The methods may include providing a plurality of transitional layers from a component core including a relatively lightweight material to an outer layer including a relatively heavyweight material heavier in weight than the relatively lightweight material, the plurality of layers having increasingly higher proportions of the relatively heavyweight material than the relatively lightweight material from the component core to the outer layer; and diffusion bonding the plurality of layers and the outer layer by consolidation of the layers.

A slightly modified illustrative embodiment of the methods may include obtaining a component core including a first material; forming a base layer including a mixture having the first material and a second material heavier in weight than the first material on the component core, the base layer having a higher proportion of the first material than the second material; forming at least one mixed layer including a mixture of the first material and the second material on the base layer the at least one mixed layer having a higher proportion of the second material than the base layer; forming a final layer including the second material on the at least one mixed layer; and consolidating the base layer, the at least one mixed layer and the final layer by diffusion bonding then layers.

Another slightly modified illustrative embodiment of the methods may include obtaining a component including a relatively lightweight material; placing at least one stabilizing structure on the component; sequentially applying a plurality of applied layers on the component and the stabilizing structure by applying the relatively lightweight material over the component and applying over the relatively lightweight material a plurality of layers having gradually progressively higher proportions of the relatively heavyweight material than preceding ones of the plurality of layers closer to the component, with an outer layer of the plurality of applied layers including the relatively heavyweight material; diffusion bonding the plurality of applied layers by consolidation of the plurality of applied layers; and cutting component features in the plurality of applied layers.

DESCRIPTION OF DRAWINGS

Illustrative embodiments of the disclosure will now be described, by way of example, with reference to the accompanying drawings, in which:

FIG. 13 is a sectional view of a typical bearing assembly with an outer race, an inner race and multiple roller bearings between the outer race and, the inner race, the roller bearings fabricated according to the methods of fabricating reduced weight component;

FIG. 14 is a side view of a roller hearing core which is of a relatively lightweight material and from which multiple roller bearings are machined in implementation of an illustrative embodiment of the methods of fabricating reduced weight components;

FIG. 15 is a longitudinal sectional view of a sealed can with multiple roller bearings inside the can and filler powder filling the can interior in hot isostatic processing (HIP) of the roller bearings to consolidate the layers of progressively increasing heavyweight material applied to all roller bearing components of the roller bearings;

DETAILED DESCRIPTION

Figure 1:
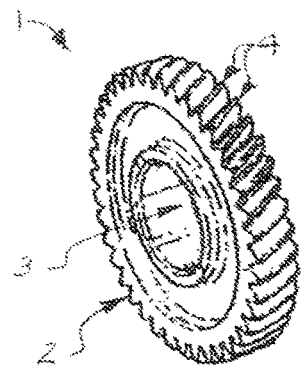
FIG. 1 is a perspective view of an exemplary gear fabricated according to an illustrative embodiment of the methods of fabricating reduced weight components.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations, other than those which are described herein and which fall within the scope of the appended claims are possible. Furthermore, there is no intention to be bound by any expressed or implied theory presented in the preceding technical field, background, brief summary or the following detailed description. Relative terms such as "front" and "rear" are used in aid in an understanding of the illustrative embodiments of the methods and are not intended to be construed in a limiting sense.

Illustrative embodiments of the disclosure are generally directed to methods of fabricating reduced weight components while retaining contact wear resistance of the components for apparatuses which are subject to strict weight requirements by exploiting differences in the weights of materials used to fabricate the components. The methods may include cladding of steel to a titanium alloy by loosely thermal spraying the powdered steel or steel alloy onto the titanium by way of a series of gradient layers, the particles of which are barrier-protected from direct contact. The powder may be thermally sprayed in a loosely-packed manner to fit various irregularly-shaped components and enhance the efficiency of the HIP-processed diffusion bonding. The methods may include the use of semi-consolidated sub parts such as shafts, spiral bevel pinions, roller bearing components and the like which are fabricated of a relatively lightweight material such as titanium and sprayed over with a relatively heavyweight material such as steel or steel alloy to enhance diffusion bonding.

Direct bonding of titanium and steel may generate brittle $Ti_3Fe$ compounds. Therefore, diffusion bonding which includes gradient layering of titanium and steel powder particles and the use of barrier particles between the titanium body or core, and titanium powder particles and the steel or steel alloy contact surfaces of the component may be necessary to prevent direct contact of the steel with the titanium. The barrier particles may include a titanium or steel particle core with a particle coating of a neutral metal such as niobium (Nb), rhenium (Re) and/or vanadium (V), for example and without limitation. The particle coating may be applied to the particle core using CVD (chemical vapor deposition), electroplating or other suitable deposition processes known by those skilled in the art. Gradient layering of the titanium and steel along with the barrier particles may prevent stress concentrations due to the differences in crystal lattice structures, microstructures, differential thermal expansion, and differential modulii of elasticity between titanium and steel. The gradient-layered titanium and steel powder particles may be thermally-sprayed as loosely as possible to enhance diffusion bonding.

The methods of the disclosure may be broadly classified as two procedures, both of which may utilize a method of hermetically sealing the thermally- and loosely-sprayed powdered steel or steel alloy and/or thermally-sprayed composite and subjecting it to Hot Isostatic Press (HIP) processing for consolidation. In the first procedure, a sacrificial metal blank or mold may be formed as a final component mirror image. Into this mold, steel powder particles may be thermally sprayed, with the first spray being that which will be the working surface of the final finished component. In this procedure, there must be access to the mold surface for the spray gun to apply the layers.

In the second procedure, the reverse process may be utilized. Thus, the shape or size of the final component may be such that it is impossible to spray into a mirror or reverse image mold. Therefore, a center core of titanium (which may be porous for ease of diffusion bonding) may be utilized as a base upon which the steel is sprayed through the layered gradient system. The last layer of spray may be the steel which becomes the working surface of the final finished component.

Referring initially to FIG. 1 of the drawings, an exemplary spur gear 1 which is fabricated according to an illustrative embodiment of the methods of fabricating reduced weight components is illustrated. The spur gear 1 may be a component of a gearbox (not illustrated) which is used in the transmission of a helicopter or other aircraft or an auto racing or other vehicle, for example and without limitation. The spur gear 1 may include an annular gear body or core 2 through which extends a drive shaft opening 3. Gear teeth 4 are provided in the outer surface of the gear core 2. As will be hereinafter further described, the gear core 2 is fabricated of a relatively lightweight material such as titanium or titanium-aluminum alloy, for example and without limitation. The gear teeth 4 are formed at least in part of a material which has higher wear resistance than the lower-weight material of which the gear core 2 is made and may be heavier in weight than the material of the gear core 2. The relatively heavyweight material imparts substantial wear resistance to the gear teeth 4.

The relatively lightweight material of the gear core 2 substantially reduces the weight of the spur gear 1 over the weights of gears fabricated using conventional methods and materials. In some embodiments, the gear core 2 may be fabricated of titanium or titanium-aluminum alloy whereas the gear teeth 4 may be formed at least in part of steel or steel alloy, for example and without limitation, to enhance the contact and wear resistance and stiffness of the gear teeth 4 while optimizing the overall weight of the spur gear 1 particularly for applications in which the spurgear 1 is subject to strict weight requirements. Additional gears and other components such as bearings of the gearbox may be fabricated according to the methods of fabricating reduced weight components to substantially reduce the overall weight of the helicopter or other aircraft. Together, the lighter-weight components reduce the weight of the aircraft to within or below the mandated weight restriction guidelines for the aircraft, particularly in the case of aircraft which are subject to strict weight requirements such as in military and other applications.

Figure 2:
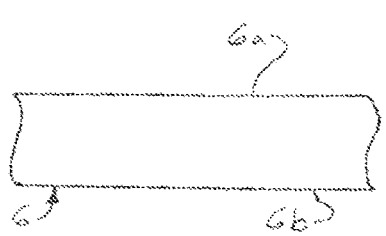
FIGS. 2-11 are enlarged sectional views illustrating sequential fabrication of the gear according to an illustrative embodiment of the methods of fabricating reduced weight components.

Referring next to FIGS. 2-11 of the drawings, sequential fabrication of the spur gear 1 according to an illustrative embodiment of the methods of fabricating reduced weight components is illustrated. As illustrated in FIG. 2, a sacrificial gear mold or blank 6 is provided. In some embodiments, the sacrificial gear blank 6 may include an elongated bar stock of material such as C1018 steel, for example and without limitation. In other embodiments, alternative materials for the sacrificial gear blank 6 may be used according to different applications of the methods. The sacrificial gear blank 6 may have a front blank surface 6a and a rear blank surface 6b.

As illustrated in FIG. 1, a reverse image mold may be fabricated by forming a reverse image of the gear teeth 4 (FIG. 1) which will ultimately be formed in the gear core 2. The reverse image of the gear teeth may be cut in the front blank surface 6a, forming multiple gear teeth undercuts 10. The gear teeth undercuts 10 may be made in the front blank surface 6a using conventional machining techniques known by those skilled in the art. Each gear teeth undercut 10 has undercut surfaces 11.

Figure 4:
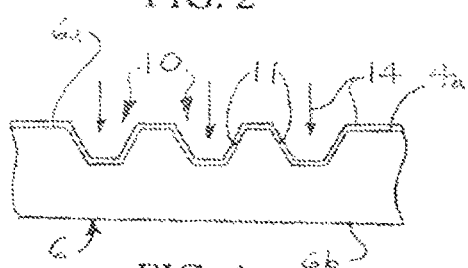

As illustrated in FIG. 4, an outer layer 14 may be applied over the undercut surfaces 11 of the gear teeth undercuts 10 and the portions of the front blank surface 6a which remain between the gear teeth undercuts 10. In some embodiments, the outer layer 14 may be applied over the undercut surfaces 11 and the remaining portions of the front blank surface 6a by spraying a particulate material of which the outer layer 14 will be made on the undercut surfaces 11 and the remaining portions of the front blank surface 6a as loosely as possible using conventional thermal spraying techniques known by those skilled in the art. The outer layer 14 may include a mixture having the relatively heavyweight material and at least one relatively lightweight material of which the gear core 2 will be made, with a higher proportion of the relatively heavyweight material than the lightweight material. In some embodiments, the outer layer 14 may include a mixture of about 95% by weight alloy steel and about 5% by weight titanium alloy, for example and without limitation. In some embodiments, hard surface particles such as carbide may be added to the powder particles of the relatively heavyweight material to enhance surface wear resistance.

Figure 5:
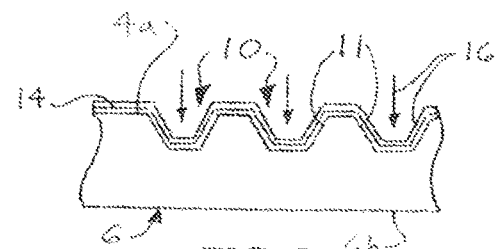

As illustrated in FIG. 5, at least one barrier layer or mixed layer 16 may be applied over the outer layer 14. In some embodiments, the mixed layer(s) 16 may be applied over the outer layer 14 by loosely spraying the particulate mixed layer material on the outer layer 14 using conventional thermal spraying techniques. The mixed layer 16 may include a mixture having the relatively heavyweight material of which the contact surfaces of the gear 1 will be made and at least one relatively lightweight material of which the gear core 2 will be made. One or more of the mixed layers 16 closest to the outer layer 14 may have a higher proportion of the relatively heavyweight material than the relatively lightweight material, with a higher proportion of the relatively lightweight material than is provided in the outer layer 14. Successive mixed layers 16 may have gradually progressively higher proportions of the relatively lightweight material than preceding mixed layers 16 which are closer to the outer layer 14. In some embodiments, the outer layer 14 and the transitional mixed layer or layers 16 may have a total thickness of about 50,000-100,000s of an inch. A base layer 17 may in like manner be applied over the outermost mixed layer 16. The base layer 17 may include the relatively lightweight material of which the gear core 2 will be made without the relatively heavyweight material.

Figure 6:
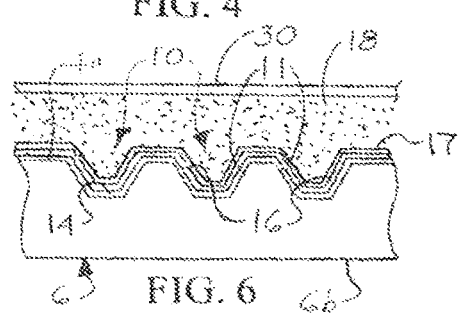

As illustrated in FIG. 6. a barrier plate or "fence" 30 may be placed in spaced-apart relationship to the base layer 17. The spacing between the fence 30 and the base layer 17 may correspond to the radial thickness of the gear core 2. A powder layer 18 may next be applied over the base layer 17. The powder layer 18 may overfill each layered gear teeth undercut 10 and the layered remaining portions of the front blank surface 6a as well as the space between the fence 30 and the base layer 17. In some embodiments, the powder layer 18 may be applied over the base layer 17 by spraying the particulate transition layer material on the base layer 17 using conventional thermal spraying techniques or by filling the required volume between the base layer 17 and the fence 30 with powder or porous solid. The powder layer 18 may include the relatively lightweight material of which the gear core 2 will be made. In some embodiments, the powder layer 18 may include a titanium/aluminum/vanadium alloy such as Ti6Al-4V containing 90% Ti, 6% aluminum and 4% vanadium, for example and without limitation.

Figure 7:
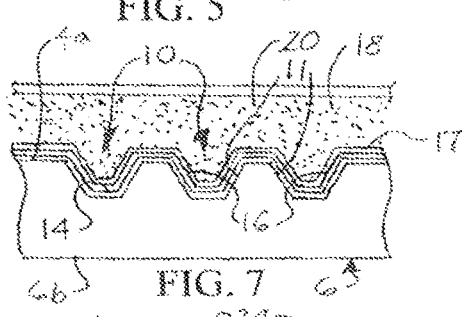
Figure 8:
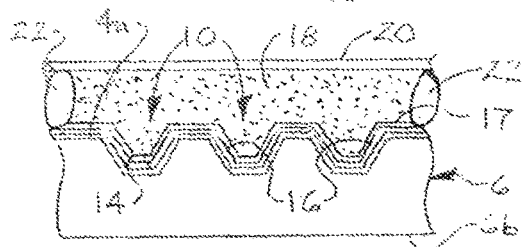

As illustrated in FIG. 7, a can 20 may be applied over the powder layer 18. In some embodiments, the can 20 may include a steel plate, for example and without limitation. As illustrated in FIG. 8, the can 20 may be hermetically sealed against the powder layer 18 such as by welding 22, for example and without limitation. In some embodiments, the fence 30 (FIG. 6) may remain in place as the can 20.

Figure 9:
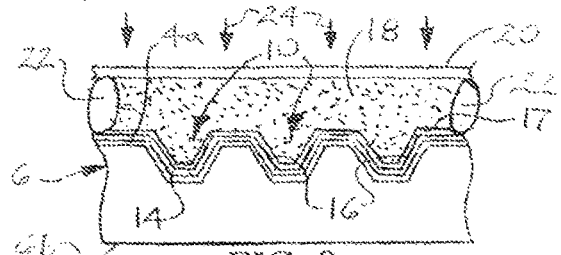

As illustrated in FIG. 9, the sacrificial gear blank 6, the layers 14, 16, 17, the powder layer 18 and the can 20 may be subjected to HIP (Hot Isostatic Press) processing 24. The HIP processing 24 may be carried out in a standard or conventional HIP furnace known by those skilled in the art. Non-limiting exemplary process parameters for the HIP processing 24 may include HIP temperatures of typically from about 1700 to 2100 degrees F. and HIP pressures of from about 15,000 to about 30,000 psi applied to the can 20. The HIP pressure may be applied using argon or other inert gas as is known by those skilled in the art. Accordingly, the HIP processing 24 presses the can 20 against the powder layer 18, removing voids in the powder layer 18 and forming the gear core 2 (FIG. 10) of the gear 1 which is substantially free of voids and is metallurgically fused to the outer layer 14, the mixed layer(s) 16, the base layer 17 and the sacrificial gear blank 6. After the HIP processing 24 is completed, the can 20 may be removed from the underlying gear core 2 using machine cutting tools or other suitable techniques known by those skilled in the art. In some embodiments, the can 20 may be thermally sprayed and consolidated using mechanical forces or impacting according to the knowledge of those skilled in the art prior to HIP processing.

Figure 3:
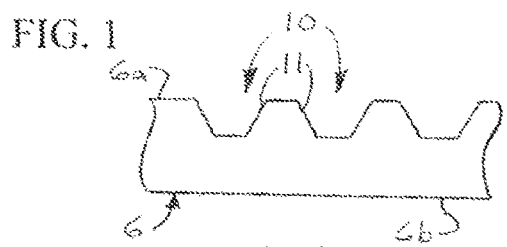
Figure 10:
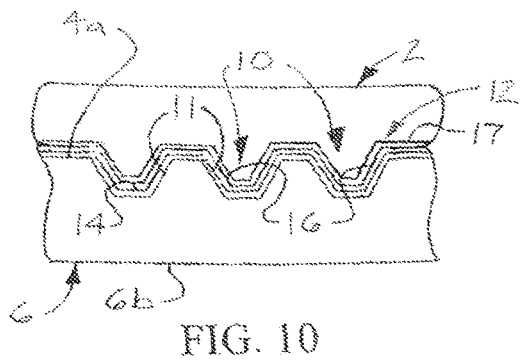
Figure 11:
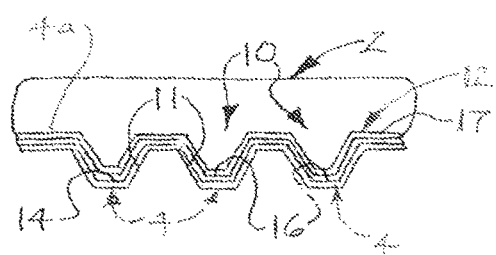

As illustrated in FIGS. 10 and 11, the gear teeth 4 (FIG. 11) may be cut in rear blank surface 6b of the sacrificial gear blank 6 using conventional machining techniques known by those skilled in the art. The gear teeth 4 correspond to the reverse image of the gear teeth undercuts 10 which were previously made in the front blank surface 6a (FIG. 3). Accordingly, the base layer 17 and the mixed layer(s) 16 may together form a transition layer 12 between the gear core 2 and the outer layer 14, which forms the contact surface of the gear teeth 4.

After fabrication is completed, the gear 1 may be subjected to post-processing. Post-processing of the gear 1 may include heat treatment at about 1500 degrees F., followed by quenching and machining or grinding of the precise gear dimensions into the gear teeth 4 according to the knowledge of those skilled in the art. The relatively lightweight material composition of the gear core 2 dramatically reduces the weight of the gear 1, whereas the relatively heavyweight material composition of the gear teeth 4 enhances the wear resistance characteristics of the gear teeth 4.

Figure 11A:
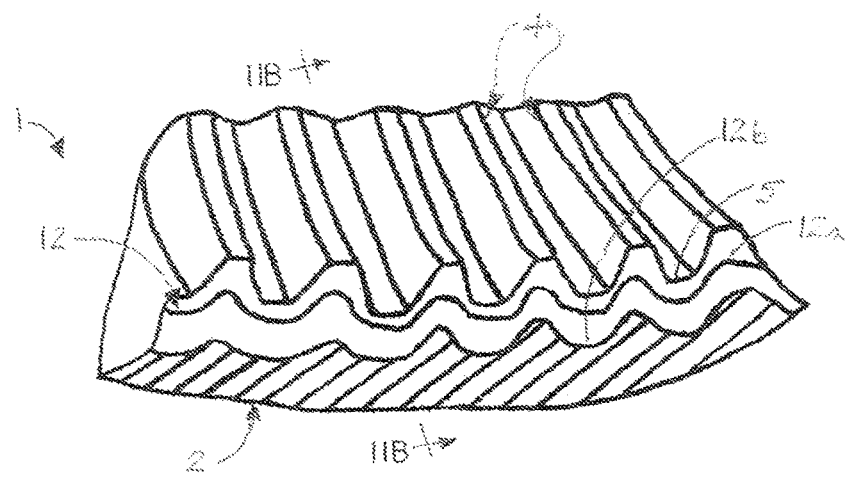
FIG. 11A is a sectional view of a portion of a gear fabricated according to the methods of fabricating reduced weight components illustrated in FIGS. 2-11.
Figure 11B:
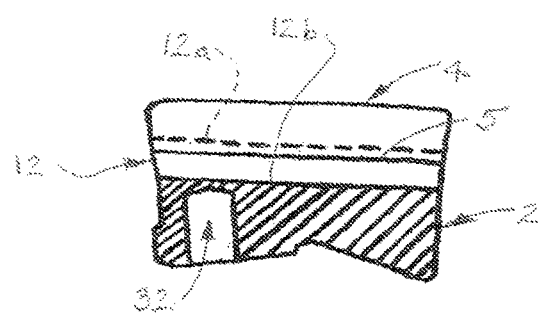
FIG. 11B is a sectional view taken along section lines 11B-11B in FIG. 11A.

Referring next to FIGS. 11A and 11B of the drawings, a sectional view of a portion of a gear 1 fabricated according to the illustrative embodiment of the methods of fabricating reduced weight components of FIGS. 1-11 is illustrated. The transition layer 12 between the gear core 2 and the outer layer 14 may have an undulating cross-sectional profile with transition layer crests 12a which extend into the respective gear teeth 4 and transition layer troughs 12b between the transition layer crests 12a. A tooth root 5 extends between each pair of adjacent gear teeth 4. As illustrated in FIG. 11B, in some embodiments, the transition layer crests 12a of the transition layer 12 may protrude beyond the tooth roots 5 between the adjacent gear teeth 4. The methods may be used to fabricate gears 1 in which up to 50% or more of the volume of the gear 1 is fabricated of titanium and/or other relatively lightweight material. The gear roots 5 may be undercut and shaped to follow lines of stress applied to the gear teeth 4 and may accord with flexural and torsional loading on the gear 1.

The gear core 2 of the gear 1 can be attached to a gear shaft (not illustrated) using mechanical fastening or Hot Isostatic Press (HIP) cladding, for example and without limitation, according to the knowledge of those skilled in the art. As illustrated in FIG. 11B, in an exemplary mechanical fastening application, a threaded mount opening 32 may be provided in the gear core 2. A threaded fastener (not illustrated) may threadably engage the threaded mount opening 32 and a registering mount opening (not illustrated) in the gear shaft to secure the gear 1 on the gear shaft.

In HIP cladding methods, the joining surfaces of the gear core 2 and the gear shaft may be machined to form a suitable interface. HIP processing may be carried out under high argon pressure (~15,000 psi) at temperatures of over 1700 degrees F. Alternative techniques known by those skilled in the art may be used to secure the gear core 2 of the gear 1 to the gear shaft.

Figure 11C:
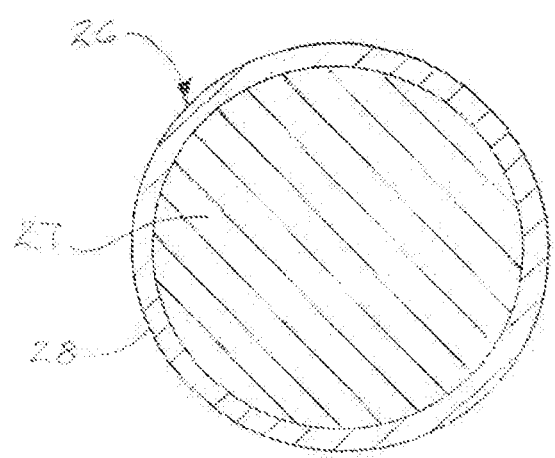
FIG. 11C is a sectional view of a typical hybrid particle having a particle core and a particle coating or surface in implementation of an illustrative embodiment of the methods of fabricating reduced weight components.

Referring next to FIG. 11C of the drawings, in some implementations of the methods of fabricating reduced weight components, the mixed layer 16 (FIGS. 6-11) may include hybrid particles 26 each having a particle core 27 and a particle coating 28 on the particle core 27. In some applications, the particle core 27 may include the relatively lightweight material such as titanium or titanium-aluminum alloy, for example and without limitation, which is used to fabricate the gear core 2. In some applications, the particle core 27 may include the relatively heavyweight material such as steel, for example and without limitation, which is used to fabricate the base layer 17. The particle coating 28 may include, niobium (Ni), Vanadium (V) and/or Rhenium (Re), for example and without limitation. The particle coating 28 may be deposited on the particle core 27 using any of a variety of deposition techniques which are suitable for the purpose, including hut not limited to chemical vapor deposition (CVO) and electroplating. Accordingly, the hybrid particles 26 may prevent or minimize direct contact and joining of the relatively heavyweight particles (typically steel) with the relatively lightweight particles (typically titanium) in the outer layer 14, the mixed layer 16 and the base layer 17, and thus, the undesired generation of brittle $Ti_3Fe$ inter-metallic compounds.

Figure 12:
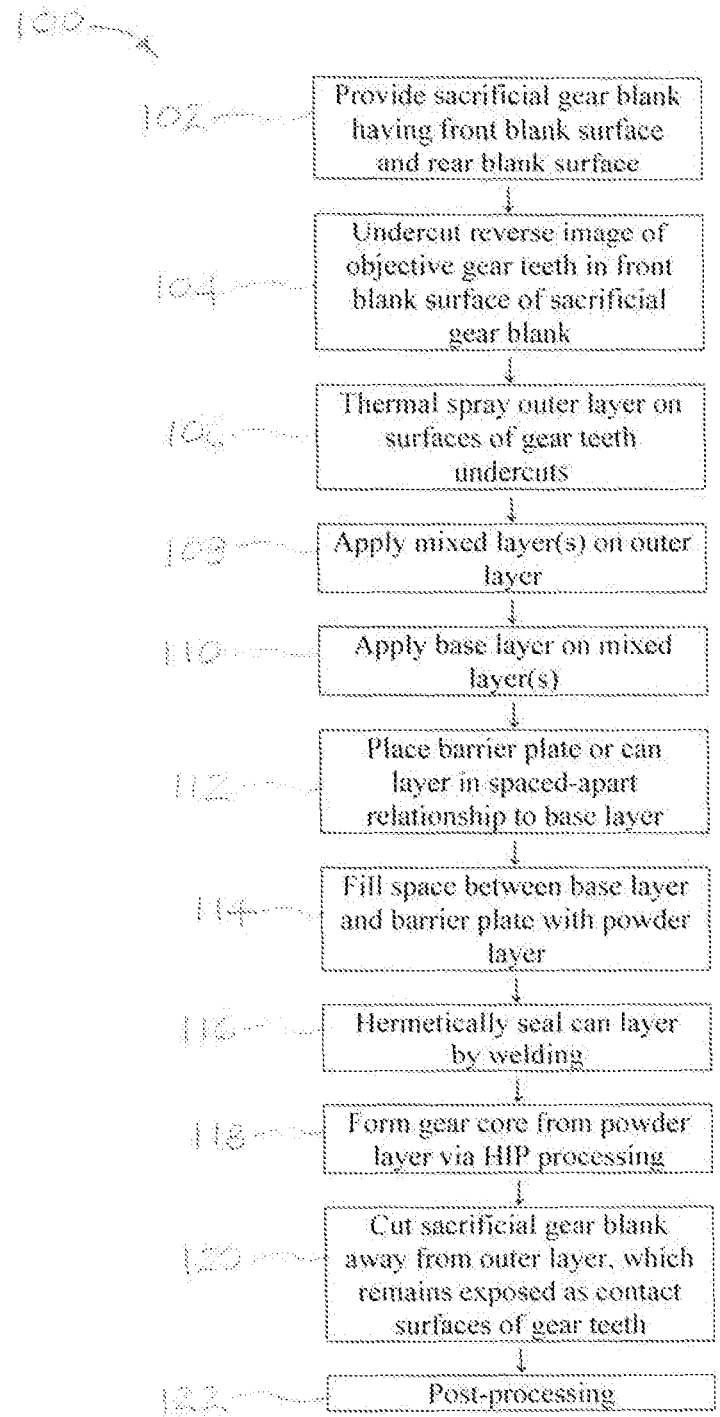
FIG. 12 is a flow diagram of an illustrative embodiment of the methods of fabricating reduced weight components.

Referring next to FIG. 12 of the drawings, a flow diagram of a method of fabricating a reduced weight gear such as the spur gear 1 in FIG. 1, for example and without limitation, according to an illustrative embodiment of the methods of fabricating reduced weight components is generally indicated by reference numeral 100. In block 102, a sacrificial gear blank is provided. The sacrificial gear blank may have a front blank surface and a rear blank surface. In block 104, a reverse image of the gear teeth which will ultimately be formed in the gear is undercut in the, front gear surface of the sacrificial gear blank to form a reverse image mold. In block 106, an outer layer may be applied to the surfaces of the undercuts and the portions of the front blank surface which remain between the undercuts using thermal spraying or other suitable technique. The outer layer may include the relatively heavyweight material which will ultimately form the contact surfaces of the gear teeth.

In block 108, at least one mixed layer may be applied over the outer layer using thermal, spraying or other suitable technique. The mixed layer may include a mixture of the relatively heavyweight material and at least one relatively lightweight material of which the gear core will be made. One or more of the mixed layers closest to the outer layer may have a higher proportion of the relatively heavyweight material than the relatively lightweight material. Successive mixed layers may have gradually progressively higher proportions of the relatively lightweight material than preceding mixed layers. In some embodiments, one or more of the mixed layers may include hybrid particles. In block 110, a base layer may be applied over the outermost mixed layer. The base layer may include the relatively lightweight material of which the gear core will be made without the relatively heavyweight material.

In block 112, a barrier plate or "fence" may be placed in spaced-apart relationship to the base layer. In block 114, the space between the fence and the base layer may be filled with a porous solid material or a powder layer which is applied over the base layer and confined by the barrier plate or fence. The powder layer may include the relatively lightweight material of which the gear core will be made. In block 116. the can may be hermetically sealed against the powder layer such as by welding, for example and without limitation.

In block 118, the gear core may be formed from the porous solid material or powder layer by subjecting the sacrificial gear blank, the outer layer, the mixed layer(s), the base layer and the powder layer to HIP processing in which the can is pressed against and eliminates voids in the powder layer. In some embodiments, the can may be thermally sprayed and consolidated using mechanical forces or impacting according to the knowledge of those skilled in the art prior to HIP processing. In block 120, the sacrificial gear blank is cut away to the outer layer. Accordingly, the outer layer, the mixed layer(s) and the base layer form the gear teeth with the outer layer remaining exposed as the contact surfaces of the gear teeth. The gear teeth correspond to a reverse image of the gear teeth undercuts which were made in the gear blank in block 104. In block 122, the gear may be subjected to post-processing steps such, as heat-treatment, quenching and machining or grinding, for example and without limitation, according to methods which are known by those skilled in the art.

It will be at by those skilled in the art that the methods of fabricating reduced weight components as heretofore described with respect to fabrication of the spur gear 1 in FIGS. 1-12 can be used to fabricate a variety of components of aircraft, vehicles or other apparatuses which are subjected to strict weight requirements. The methods may be used to fabricate reduced weight components in multiple locations and mechanisms within an aircraft, vehicle or other apparatus as part of a comprehensive strategy to reduce the overall weight of the apparatus to within or even beyond the weight restriction guidelines for the apparatus.

Referring next to FIGS. 13-15A of the drawings, sequential fabrication of roller bearings 40 for a roller bearing assembly 36 (FIG. 13) according to an illustrative embodiment of the methods of fabricating reduced weight components is illustrated. As illustrated in FIG. 13, the roller bearing assembly 36 may include an annular outer race 37 and a cylindrical inner race 38 inside the outer race 37. Multiple roller bearings 40 are disposed between the outer race 37 and the inner race 38. The roller hearing assembly 36 used in the transmission of a helicopter or other aircraft or an auto racing or other vehicle. for example and without limitation.

As illustrated in FIG. 14, a roller bearing core 44 is provided. In some embodiments, the roller bearing core 44 may include an elongated bar stock of a relatively lightweight material such as titanium, for example and without limitation. A non-limiting-example of a material which is suitable for the roller bearing core 44 may include a titanium/aluminum/vanadium alloy such as Ti6Al-4V containing, 90% Ti, 6% aluminum and 4% vanadium.

As illustrated in FIG. 15, the roller bearings 40 are cut from the roller bearing core 44 typically using conventional machining techniques known by those skilled in the art. The adjacent roller bearings 40 may remain connected to each other in end-to-end relationship.

Figure 15A:
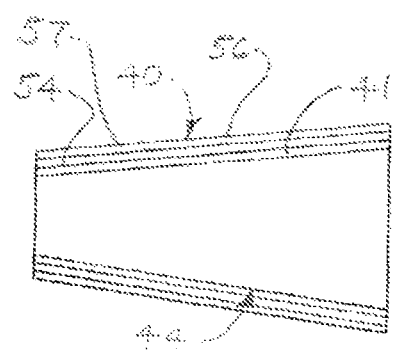
FIG. 15A is a longitudinal sectional view of a finished roller bearing fabricated according to the methods of fabricating reduced weight components.

As illustrated in FIG. 15A, a base layer 54 may initially be applied over the race contact surface 41 of each roller hearing 40. In some embodiments, the base layer 54 may be applied over the race contact surface 41 by loosely spraying a particulate material of which the base layer 54 will be made on the race contact surface 41 using conventional thermal spraying techniques known by those skilled in the art. The base layer 54 may include a mixture having the relatively lightweight material of which the roller bearing core 44 (FIG. 14) is made and at least one relatively heavyweight material, with a higher proportion of the relatively lightweight material than the relatively heavyweight material. In some embodiments, the base layer 54 may include a mixture of about 95% by weight titanium and about 5% by weight 52100 steel, for example and without limitation.

As further illustrated in FIG. 15A, at least one mixed layer 56 may be applied over the base layer 54. in sonic embodiments, the mixed layer 56 may be applied over the base layer 54 by loosely spraying the particulate mixed layer material on the base layer 54 using conventional thermal spraying techniques. The mixed layer 56 may include a mixture having the relatively lightweight material of which the roller bearing core 44 is made and at least one relatively heavyweight material. One or more of the mixed layers 56 closest to the base layer 54 may have a higher proportion of the relatively lightweight material than the relatively heavyweight material Successive mixed layers 56 may have gradually progressively higher proportions of the relatively heavyweight material than preceding mixed layers 56 which are closer to the base layer 54. In some embodiments, one or more of the mixed layers 56 may include hybrid particles 26 (FIG. 11C). In some non-limiting embodiments, the base layer 54 and the transitional mixed layer or layers 56 may have a total thickness of up to about 100,000s of an inch. An outer layer 57 may in like manner be applied over the outermost mixed layer 56. The outer layer 57 may include the relatively heavyweight mate without the relatively lightweight material to increase the contact resistance of the race contact surface 41 of each finished roll bearing 40.

As illustrated in FIG. 15, the sprayed roller bearings 40 may be placed in a can 46 having a can interior 47. In some embodiments, the can 46 may include a sealed steel tube, for example and without limitation. A filler powder 50 may next be applied over the outer layer 57 (FIG. 15A) on the roller bearings 40. The filler powder 50 may fill the can interior 47 between the interior surface of the can 46 and the roller bearings 40. In some embodiments, the filler powder 50 may be applied over the outer layer 57 using conventional thermal spraying techniques. In some embodiments, the filler powder 50 may include mild steel powder, for example and without limitation. After application of the filler powder 50, the can 46 may be hermetically sealed such as by welding, for example and without limitation, according to the knowledge of those skilled in the art.

The roller bearings 40 may next be subjected to HIP (Hot Isostatic Press) processing. The HIP processing may be carried out in a standard or conventional HIP furnace known by those skilled in the art. Exemplary process parameters for the HIP processing may include HIP temperatures of typically from about 1700 to 2100 degrees F. and HIP pressures of from about 15,000 to about 30,000 psi applied to the can 46. The HIP pressure may be applied to the can 46 using argon or other inert gas as is known by those skilled in the art. Accordingly, the HIP processing presses the can 46 against the filler powder 50, the outer layer 57, the mixed layer(s) the base layer 54 and the roller bearing core 44. After the HIP processing is completed, the can 46 and filler powder 50 may be removed from the roller hearings 40 using machine cutting tools or other suitable machining techniques known by those skilled in the art. In some embodiments, the can may be thermally sprayed and consolidated using mechanical forces or impacting according to the knowledge of those skilled in the art prior to HIP processing.

After fabrication is completed, the roller bearings 40 may be subjected to post-processing. Post-processing of the roller bearings 40 may include heat treatment at about 1500 degrees F., followed by quenching and machining or grinding of the precise dimensions into the roller bearings 40 according to the knowledge of those skilled in the art. The relatively lightweight material composition of the roller bearings 40 dramatically reduces the weight of the roller bearings 40, whereas the relatively heavyweight material composition of the outer layer 57 (FIG. 5A) enhances the wear resistance characteristics of the roller bearings 40.

Figure 16:
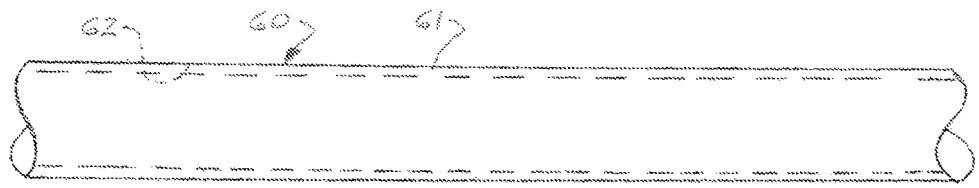
FIG. 16 is a side view of an outer race core from which outer races of the bearing assembly may be machined.

Referring next to FIGS. 16-19A of the drawings, sequential fabrication of the outer race 37 of the roller bearing assembly 36 (FIG. 13) according to an illustrative embodiment of the methods of fabricating reduced weight components is illustrated. As illustrated in FIG. 16, a tubular outer race core 60 having a core wall 61 traversed by a core bore 62 is provided. The outer race core 60 may be a relatively lightweight material such as titanium, for example and without limitation. A non-limiting example of a material which is suitable for the outer race core 60 may include a titanium/aluminum/vanadium alloy such as Ti6Al-4V containing 90% Ti, 6% aluminum and 4% vanadium.

Figure 17:
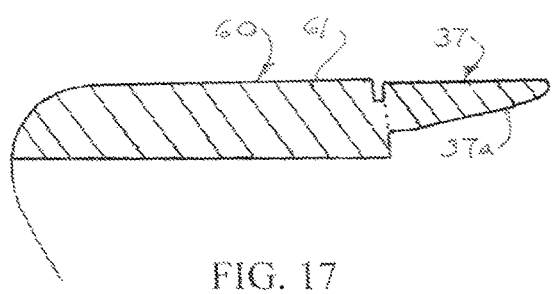
FIG. 17 is a partial sectional view of an outer race machined in the race core.

As illustrated in FIG. 17, multiple outer races 37 may be cut from the outer race core 60 typically using conventional machining techniques. The adjacent outer races 37 may remain connected to each other in end-to-end relationship.

Figure 18:
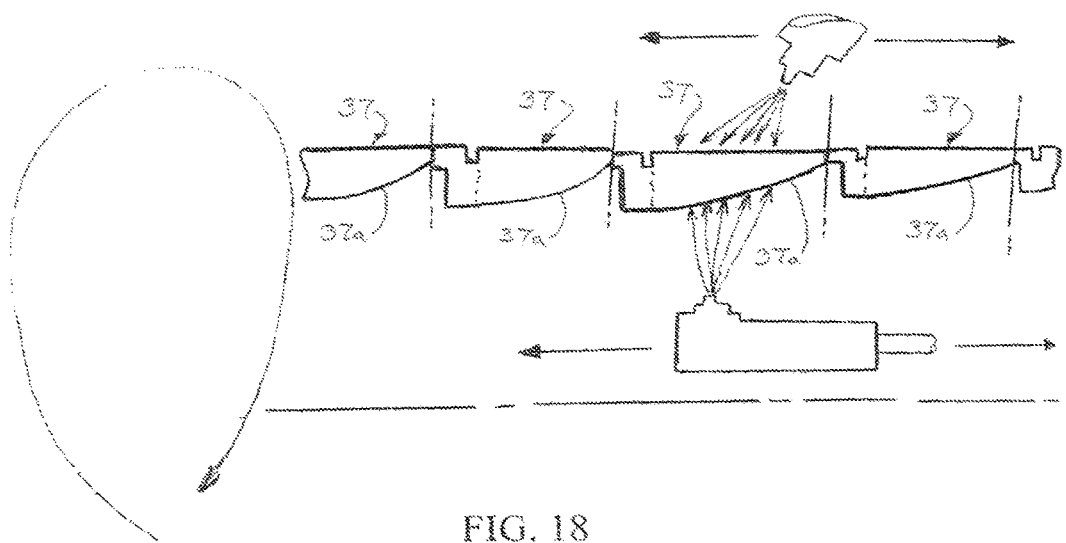
FIG. 18 is a side view of multiple outer races in thermal spray application of powder layers of progressively increasing heavyweight material applied to the race contact surface of the roller bearings.
Figure 19:
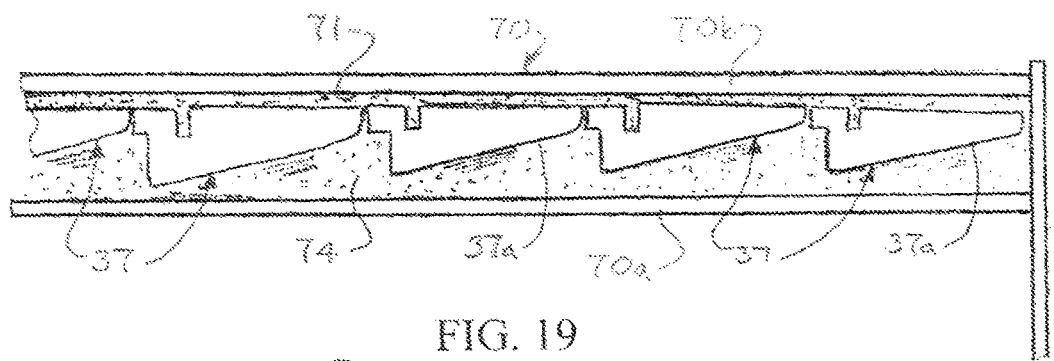
FIG. 19 is a longitudinal sectional view of a sealed can with multiple outer races inside the can and filler powder filling the can interior in hot isostatic processing (HIP) of the roller bearings to consolidate the layers of progressively increasing heavyweight material applied to the bearing contact surface of the outer races.
Figure 19A:
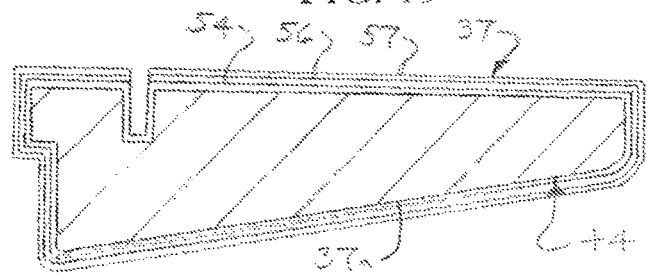
FIG. 19A is a longitudinal sectional view of outer race fabricated according to the methods of fabricating reduced weight components.

As illustrated in FIGS. 18 and 19A, a base layer 54 may initially be applied over the contact surfaces 37a of each outer race 37. In some embodiments, the base layer 54 may be applied over the contact surfaces 37a by loosely spraying a particulate material of which the base layer 54 will he made on the contact surfaces 37a using conventional thermal spraying techniques known by those skilled in the art, as illustrated in FIG. 18, as the connected outer races 37 are typically rotated to facilitate uniform application. The base layer 54 may include a. mixture having the relatively lightweight material of which the outer race core 60 (FIG. 16) is made and at least one relatively heavyweight material, with a higher proportion of the relatively lightweight material than the relatively heavyweight material. In some embodiments, the base layer 54 may include a mixture of about 95% by weight titanium and about 5% by weight 52100 steel, for example and without limitation.

As further illustrated in FIG. 19A, at least one mixed layer 56 may be applied over the base layer 54. In some embodiments, the mixed layer 56 may be applied over the base layer 54 by loosely spraying the particulate mixed layer material on the base layer 54 using conventional thermal spraying techniques, as illustrated in FIG. 18. The mixed layer 56 may include a mixture having the relatively lightweight material of which the roller bearing core 44 is made and at least one relatively heavyweight material. One or more of the mixed layers 56 closest to the base layer 54 may have a higher proportion of the relatively lightweight material than the relatively heavyweight material. Successive mixed layers 56 may have gradually progressively higher proportions of the relatively heavyweight material than preceding mixed layers 56 which are closer to the base layer 54. In some embodiments, one or more of the mixed layers 56 may include hybrid particles 26 (FIG. 11C). In some non-limiting embodiments, the base layer 54 and the transition layer or layers 56 may have a total thickness of up to about 100,000s of an inch. An outer layer 57 may in like manner be applied over the outermost mixed layer 56. The outer layer 57 may include the relatively heavyweight material without the relatively lightweight material to increase the contact resistance of the contact surface 37a of each outer race 37.

As illustrated in FIG. 19, the sprayed outer races 37 may be placed in a can 70 having a can interior 71. In some embodiments, the can 70 may include an annular can interior 71 between two concentric inner and outer sealed steel tubes 70a and 70b. respectively. A filler powder 74 may next be applied over the outer layer 57 on the outer races 37. The filler powder 74 may fill the can interior 71 between the interior surface of the can 70 and the outer races 37. In some embodiments, the filler powder 74 may be applied over the outer layer 57 using conventional thermal spraying techniques. In some embodiments, the filler powder 74 may include mild steel powder. For example and without limitation. After application of the filler powder 74, the can interior 71 of the can 70 may be hermetically sealed such as by welding. for example and without limitation.

The outer races 37 may next be subjected to HIP (Hot Isostatic Press) processing. The HIP processing may be carried out in a standard or conventional HIP furnace known by those skilled in the art. Exemplary process parameters for the HIP processing may include HIP temperatures of typically from about 1700 to 2100 degrees F. and HIP pressures of from about 15,000 to about 30,000 psi applied to the can 70. The HIP pressure may be applied to the can 46 using argon or other inert gas as is known by those skilled in the art. Accordingly, the HIP processing presses the can 70 against the filler powder 74, the outer layer 57, the mixed layer(s) 56, the base layer 54 and the roller bearing core 44. After the HIP processing is completed, the can 70 may be removed from the outer races 37 using machine cutting tools or other suitable techniques known by those skilled in the art. In some embodiments, the can may be thermally sprayed and consolidated using mechanical forces or impacting according to the knowledge of those skilled in the art prior to HIP processing.

After fabrication is completed, the outer races 37 may be subjected to post-processing. Post-processing of the outer races 37 may include heat treatment at about 1500 degrees F., followed by quenching and machining or grinding of the precise dimensions into the outer races 37 according to the knowledge of those skilled in the art. The relatively lightweight material composition of the outer races 37 dramatically reduces the weight of the outer races 37, whereas the relatively heavyweight material composition of the outer layer 57 enhances the wear resistance characteristics of the outer races 37 in the roller bearing assembly 36 (FIG. 13).

Figure 20:
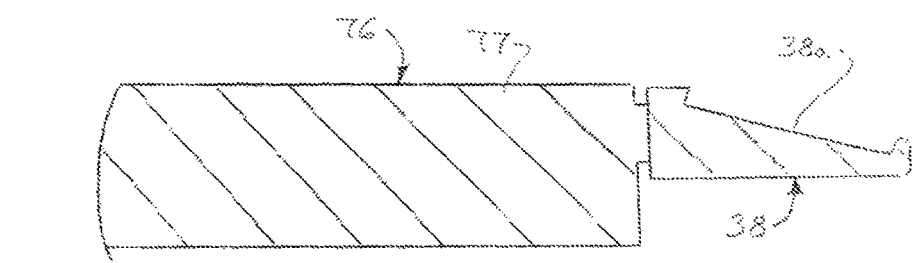
FIG. 20 is a longitudinal sectional view of a roller bearing inner race pre-machine from an inner race blank tube.
Figure 20A:
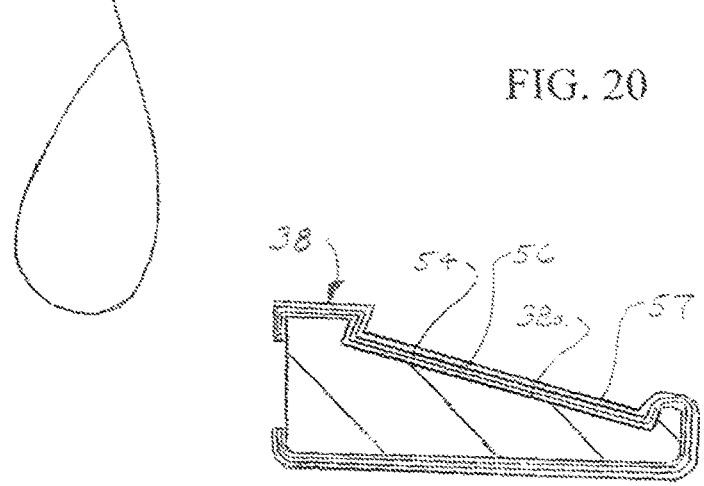
FIG. 20a is a longitudinal sectional view of a finished inner race fabricated according to the methods of fabricating reduced weight components.
Figure 21:
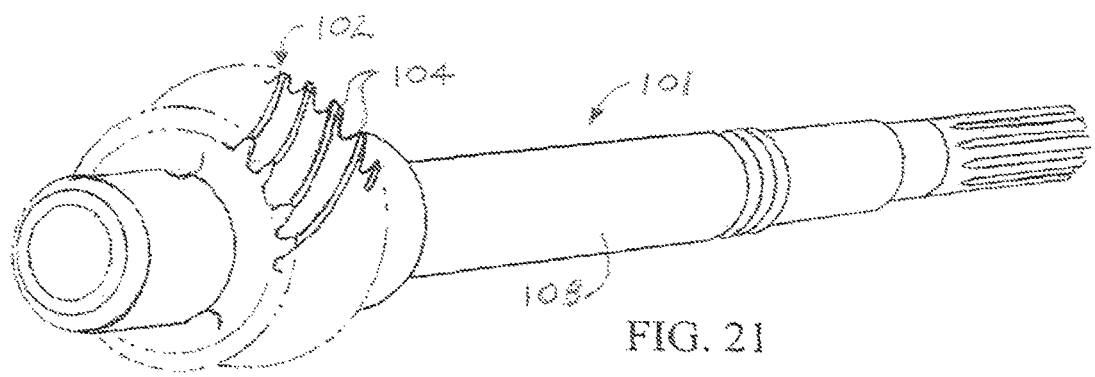
FIG. 21 is a perspective view of a typical pinion gear fabricated according to an illustrative embodiment of the methods of fabricating reduced weight components.

Referring next to FIGS. 20 and 20A of the drawings, sequential fabrication of the inner race 38 of the roller hearing assembly 36 (FIG. 13) according to an illustrative embodiment of the methods of fabricating reduced weight components is illustrated. Accordingly, multiple inner races 38 may be cut from the core wall 77 of a tubular inner race core 76 typically using conventional machining techniques. The adjacent inner races 38 may remain connected to each other in end-to-end relationship.

As illustrated in FIG. 20A, a base layer 54, at least one mixed layer 56 and an outer layer 57 may be sequentially applied to the contact surfaces 38a of each inner race 38. Deposition of the base layer 54, the mixed layer(s) and the outer layer 57 on the contact surfaces 38a and post-processing of the inner race 38 may be carried out using the same materials and techniques which were heretofore described with respect to fabrication of the outer races 37 in FIGS. 16-19A. The relatively lightweight material composition of the inner races 38 dramatically reduces the weight of the inner races 38, whereas the relatively heavyweight material composition of the outer layer 57 enhances the wear resistance characteristics of inner races 38 in the roller bearing assembly 36 (FIG. 13).

Referring next to FIGS. 21-25 of the drawings, an exemplary pinion gear 101 which is fabricated according to an illustrative embodiment of the methods of fabricating reduced weight components is illustrated. The pinion gear 101 may include an annular gear core 102 provided on an elongated gear shaft 108. Gear teeth 104 are provided in the outer surface of the gear core 102. As will be hereinafter further described, the gear core 102 is fabricated of a relatively lightweight material such as titanium or titanium-aluminum alloy, for example, and without limitation. The gear teeth 104 are farmed at least in part of a material which has higher wear resistance than the relatively lightweight material of which the gear core 102 is made and may be heavier in weight than the material of the gear core 102. The relatively heavyweight material imparts substantial wear resistance to the gear teeth 104.

Figure 22:
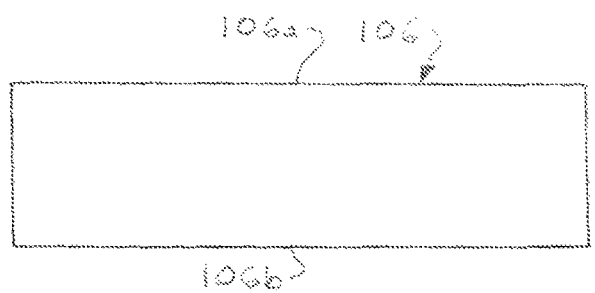
FIGS. 22-25 are sectional views illustrating sequential fabrication of the pinion gear.

Referring next to FIGS. 22-25 of the drawings, sequential fabrication of the pinion gear 101 according to an illustrative embodiment of the methods of fabricating reduced weight components is illustrated. As illustrated in FIG. 22, a gear core 106 is provided. In some embodiments, the gear core 106 may include an elongated bar stock of a relatively lightweight material such as titanium, for example and without limitation. In other embodiments, alternative materials for the gear core 106 may be used according to different applications of the methods. The gear core 106 may have a front core surface 106a and a rear core surface 106b.

Figure 23:
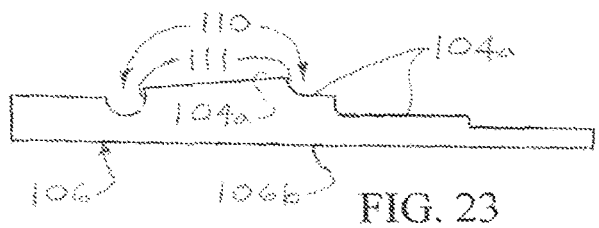

As illustrated in FIG. 23, gear teeth undercuts 110 and preliminary gear teeth 104a which will ultimately form the gear teeth 104 (FIG. 1) in the gear core 102 are cut in the front core surface 106a to form a reverse image mold or undercut gear shape for spraying. The gear teeth undercuts 110 and preliminary gear teeth 104a may be made in the front core surface 106a using conventional machining techniques known by those skilled in the art. Each gear teeth undercut 110 has undercut surfaces 111. Preliminary gear teeth 104a may extend between adjacent gear teeth undercuts 110.

Figure 24:
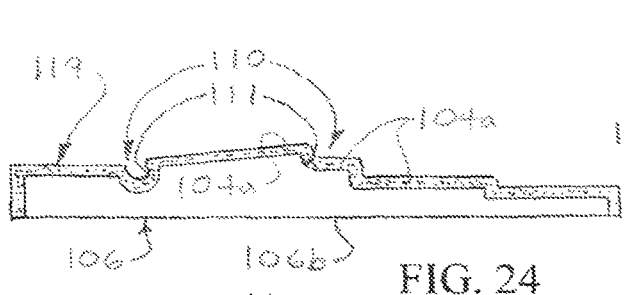
Figure 24A:
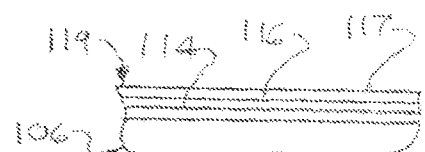

As illustrated in FIG. 24, applied layers 119 are applied over the undercut surfaces 111 of the gear teeth undercuts 110 and the preliminary gear teeth 104a. As illustrated in FIG. 24A, the applied layers 119 may include a base layer 114 which is applied over the undercut surfaces 111 of the gear teeth undercuts 110 and the preliminary gear teeth 104a, at least one mixed layer 116 which is applied over the base layer 114 and an outer layer 117 which is applied over the mixed layer(s) 116. In some embodiments, the applied layers 119 may be applied by loosely spraying a particulate material using conventional thermal spraying techniques known by those skilled in the art. The base layer 114 may include a mixture having the relatively lightweight material of which the gear core 106 is made and at least one relatively heavyweight material of which the outer layer 117 will be made, with a higher proportion of the relatively lightweight material than the relatively heavyweight material. In some embodiments, the base layer 114 may include titanium, for example and without limitation.

The mixed layer(s) 116 may be applied over the base layer 114 by loosely spraying the particulate mixed layer material on the base layer 114 using conventional thermal spraying techniques. The mixed layer(s) 116 may include a mixture having the relatively lightweight material of which the gear core 106 is made and at least one relatively heavyweight material of which the, outer layer 117 will be made. One or more of the mixed layers 116 closest to the base layer 114 may have a higher proportion of the relatively lightweight material than the relatively heavyweight material, with a higher proportion of the relatively lightweight material than is provided in the base layer 114. Successive mixed layers 116 may have gradually progressively higher proportions of the relatively heavyweight material than preceding mixed layers 116 which are closer to the base layer 114. In some embodiments, one or more of the mixed layers 116 may include hybrid particles 26 (FIG. 11C). In some non-limiting embodiments, the base layer 114 and the mixed layer(s) 116 may have a total thickness of up to about 100,000s of an inch. The outer layer 117 may in like manner be applied over the outermost mixed layer(s) 116. The outer layer 117 may include the relatively heavyweight material without the relatively lightweight material.

Figure 25:
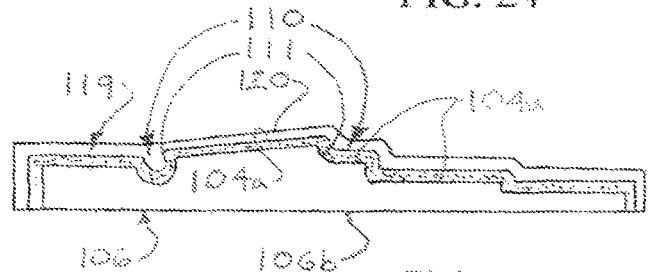

As illustrated in FIG. 25, a can 120 may be placed over the outer layer 117 of the applied layers 119. In some embodiments, the can 120 may include a steel plate, for example and without limitation. The can 120 may be hermetically sealed against the applied layers 119 such as by welding, for example and without limitation, according to the knowledge of those skilled in the art.

The gear core 106 with the can 120 in place may be subjected to HIP (Hot Isostatic Press) processing. Exemplary process parameters for the HIP processing 24 may include HIP temperatures of typically from about 1700 to 2100 degrees F. and HIP pressures of from about 15,000 to about 30,000 psi applied to the can 120. The HIP pressure may be applied to the can 120 using argon or other inert gas as is known by those skilled in the art. Accordingly, the HIP processing presses the can 120 against the applied layers 119, removing voids in the applied layers 119, and encouraging diffusion bonding of all metal, and forming the gear teeth 104 which are substantially free of voids and metallurgically fused to the gear core 106. After the HIP processing is completed, the can 20 may be removed from the underlying gear teeth 104 using machine cutting tools or other suitable techniques known by those skilled in the art. In some embodiments, the can 120 may be thermally sprayed and consolidated using mechanical forces or impacting according to the knowledge of those skilled in the art prior to HIP processing.

After fabrication is completed, the pinion gear 101 may be subjected to post-processing. Post-processing of the pinion gear 101 may include heat treatment at about 1500 degrees F., followed by quenching and machining or, grinding of the precise gear dimensions into the gear teeth 104 according to the knowledge of those skilled in the art.

Figure 26:
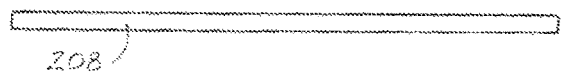
FIG. 26 is an exploded side view of a gear shaft and placement of a pair of stabilizing disks of a stabilizing structure on the gear shaft preparatory to fabrication of a pinion gear according to a slightly modified illustrative embodiment of the methods of fabricating reduced weight components.

Referring next to FIGS. 26-32 of the drawings, fabrication of a pinion gear 201 (FIG. 31) according to an alternative illustrative embodiment of the methods of fabricating reduced weight components is illustrated. The pinion gear 201 fabricated according to the method illustrated to FIGS. 26-32 may include a stabilizing shell, stiffener, skeletal framework or structure 280 which enhances the torsional resistance or rigidity of the gear teeth 204 in the gear core 202 of the finished pinion gear 201. As illustrated in FIG. 26, a gear shaft 208 is provided. The gear shaft 208 may include a relatively lightweight material such as titanium, for example and without limitation. The stabilizing structure 280 may be placed on the gear shaft 208. The stabilizing structure 280 may be fabricated of a relatively heavyweight, material having a higher torsional resistance than that of the relatively lightweight material of the gear shaft 208. In some embodiments, the stabilizing structure 280 may include steel, for example and without limitation. Accordingly, the stabilizing structure 280 may be particularly advantageous in structurally enhancing titanium alloy as the relatively lightweight material since titanium alloy has roughly one-half the rigidity of steel.

Figure 27:
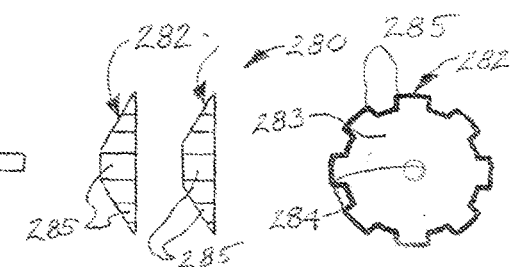
FIG. 27 is a front view of a typical stabilizing disk of the stabilizing structure.
Figure 28:
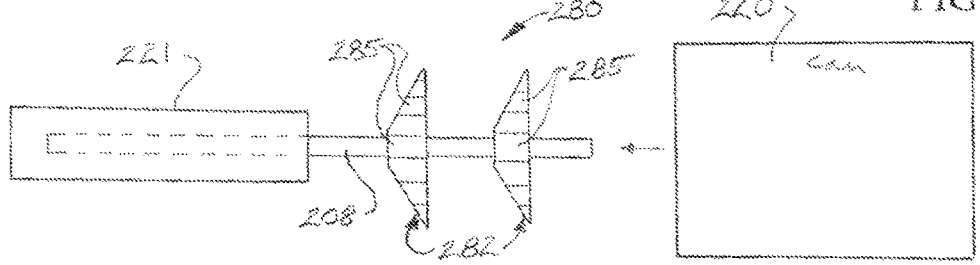
FIG. 28 is an exploded side view illustrating placement of can layers over the stabilizing structure and the gear shaft.

The stabilizing structure 280 may have arty structure or design which will strengthen or enhance the torsional resistance of the gear teeth 204 in the gear core 202 of the finished pinion gear 201. Accordingly, as illustrated in FIGS. 26 and 27, in some embodiments, the stabilizing structure 280 may include at least one stabilizing disk 282. In the example illustrated in FIGS. 26-32, the stabilizing structure 280 includes a pair of stabilizing disks 282 which may be placed on the gear shaft 208 in spaced-apart relationship to each other. Each stabilizing disk 282 may include a disk body 283 through which extends a shaft opening 284 that accommodates the gear shaft 208. Disk teeth 285 may extend from an outer surface of the disk body 283. The disk teeth 285 may generally correspond in position and number to the gear teeth 204 which will be fabricated in the gear core 202 of the finished pinion gear 201.

As illustrated in 28, a can 220 may next be placed over the stabilizing structure 280. In some embodiments, a can 221 may also be placed over the exposed portion of the gear shaft 208. In some embodiments, the can 220, 221 may include a steel plate, for example and without limitation. In some embodiments, the can 220 may be thermally sprayed and consolidated using mechanical forces or impacting according to the knowledge of those skilled in the art.

Figure 29:
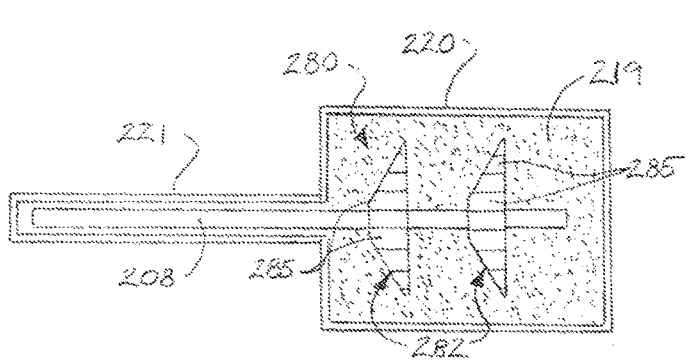
FIG. 29 is a longitudinal sectional view with multiple applied layers applied over the gear shaft and the stabilizing structure.
Figure 30:
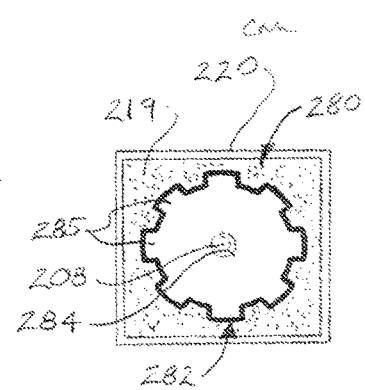
FIG. 30 is a cross-sectional view with the applied layers applied over the stabilizing structure.
Figure 33:
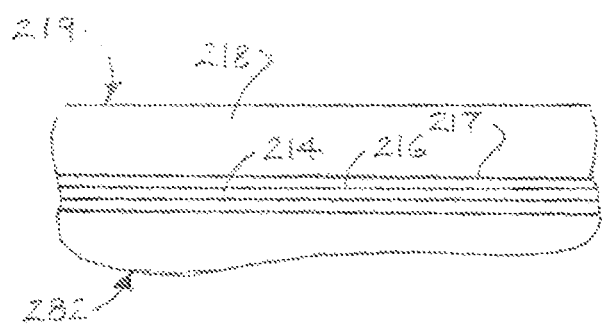
FIG. 33 is a sectional view of applied layers applied to a stabilizing disk of a stabilizing structure according to the method illustrated in FIGS. 26-32.

As illustrated in FIGS. 29, 30 and 33, applied layers 219 (FIG. 33) may next be sequentially applied between the can 220 and the stabilizing disks 282 of the stabilizing structure 280. As illustrated in FIG. 33, the applied layers 219 may include a base layer 214 which is applied over the gear shaft 208 and the disk teeth 285 of the stabilizing disk 282, at least one mixed layer 216 which is applied over the base layer 214 and an outer layer 217 which is applied over the mixed layer(s) 216. In some embodiments, the applied layers 219 may include a powder layer 218 which may include the relatively heavyweight material of which the outer layer 217 is made. In some embodiments, the applied layers 219 may be applied loosely spraying a particulate material using conventional thermal spraying techniques known by those skilled in the art. The base layer 214 may include a mixture having the relatively lightweight material of which the gear shaft 208 is made and at least one relatively heavyweight material of which the outer layer 217 will be made, with a higher quantity of the relatively lightweight material than the relatively heavyweight material. In some embodiments, the base layer 214 may include titanium, for example and without limitation.

The mixed layer(s) 216 may be applied over the base layer 214 by loosely spraying the particulate mixed layer material on the base layer 214 using conventional thermal spraying techniques. The mixed layer(s) 216 may include a mixture having the relatively lightweight material of which the gear shaft 208 is made and at least one relatively heavyweight material of which the outer layer 217 will be made. One or more of the mixed layers 216 closest to the base layer 214 may have a higher proportion of the relatively lightweight material than the relatively heavyweight material, with a higher proportion of the relatively heavyweight material than is provided in the base layer 214. Successive mixed layers 216 may have gradually progressively higher proportions of the relatively heavyweight material than preceding mixed layers 216 which are closer to the base layer 214. In some embodiments, one or more of the mixed layers 216 may include hybrid particles 26 (FIG. 11C). In some non-limiting embodiments, the base layer 214 and the mixed layer(s) 216 may have a total thickness of up to about 100,000s of an inch. The outer layer 217 may in like manner be applied over the outermost mixed layer(s) 215. The outer layer 217 may include the relatively heavyweight material without the relatively lightweight material.

After application 01 the applied layers 219, the can 220 may be hermetically sealed against the applied layers 219 such as by welding, for example and without limitation. The applied layers 219 with the can 220 in place may be subjected to HIP (Hot Isostatic Press) processing. Exemplary process parameters for the HIP processing may include HIP temperatures of typically from about 1700 to 2100 degrees F. and HIP pressures of from about 15,000 to about 30,000 psi applied to the can 220 The HIP pressure may be applied to the can 220 using argon or other inert gas as is known by those skilled in the art. Accordingly, the HIP processing presses the can 220 against the applied layers 219, removing voids in the applied layers 219. After the HIP processing is completed, the can 220 may be removed from the applied layers 219 using machine cutting tools or other suitable techniques known by those skilled in the art. The consolidated powder layer 218 may be cut away, leaving the outer layer 217 of the remaining consolidated applied layers 219 exposed on the surfaces of the gear teeth 204.

Figure 31:
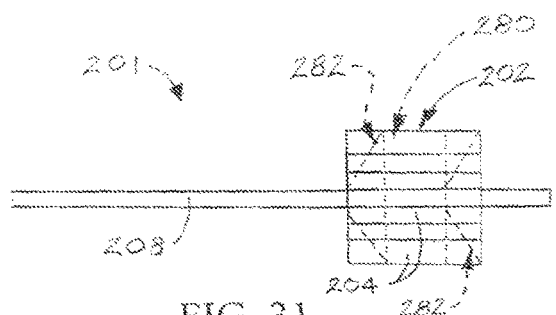
FIG. 31 is a side view of the finished pinion gear fabricated according to FIGS. 26-30 after machining of the gear teeth in the gear core, with the stabilizing disks of the stabilizing structure illustrated in phantom.
Figure 32:
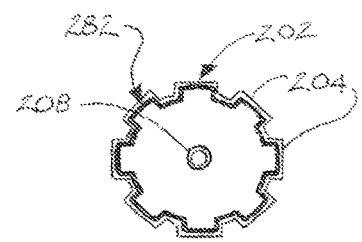
FIG. 32 is an end view of the gear core on the pinion gear illustrated in FIG. 31.

After fabrication is completed, the pinion gear 201 may be subjected to post-processing. Post-processing of the pinion gear 201 may include heat treatment at about 1500 degrees F. followed by quenching and machining or grinding of the precise gear dimensions into the gear teeth 204 according to the knowledge of those skilled in the art. As illustrated in FIGS. 31 and 32, the disk teeth 285 (FIG. 27) of the stabilizing disks 282 underlie and define the pattern of the gear teeth 204 in the gear core 202. In application of the pinion gear 201, the stabilizing disks 282 reduce elastic bending of the gear teeth 285 whereas the relatively heavyweight material of the outer layer 217 of the applied layers 219 enhances the contact resistance and bending strength of the gear teeth 204.

Figure 34:
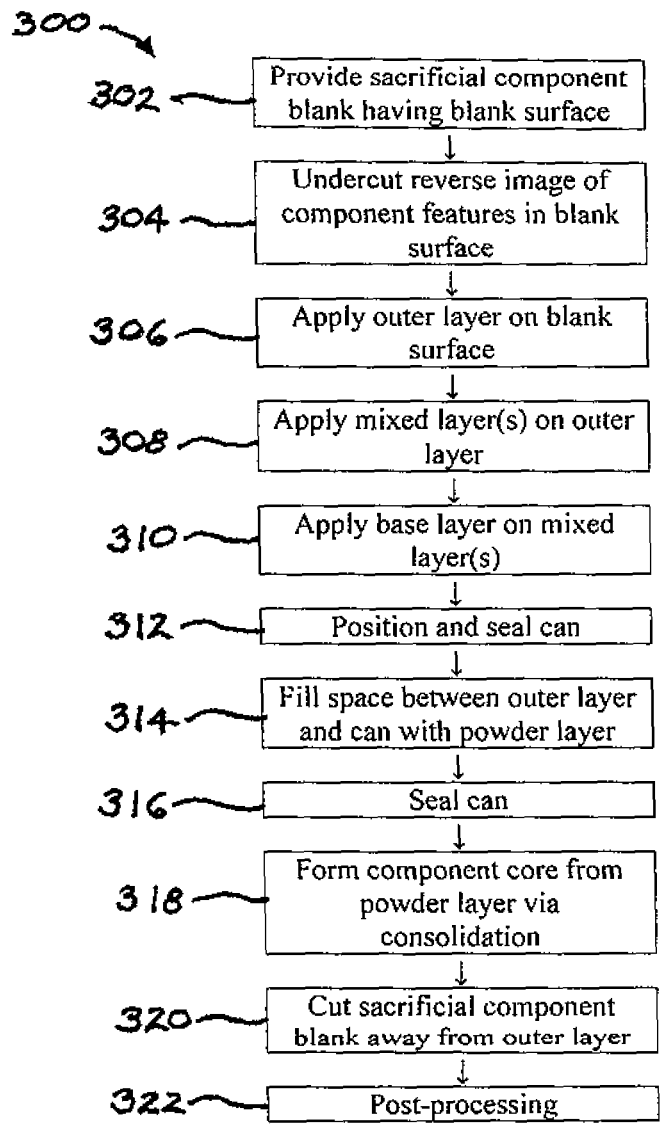
FIG. 34 is a flow diagram of an illustrative embodiment of the methods of fabricating reduced weight components.
Figure 35:
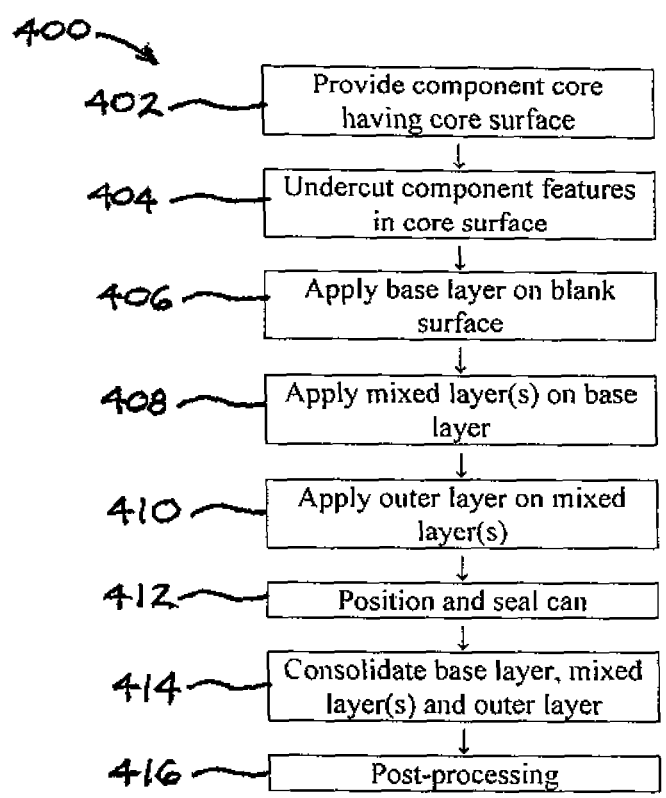
FIG. 35 is a flow diagram of a slightly modified illustrative embodiment of the preceding methods of fabricating reduced weight components.
Figure 36:
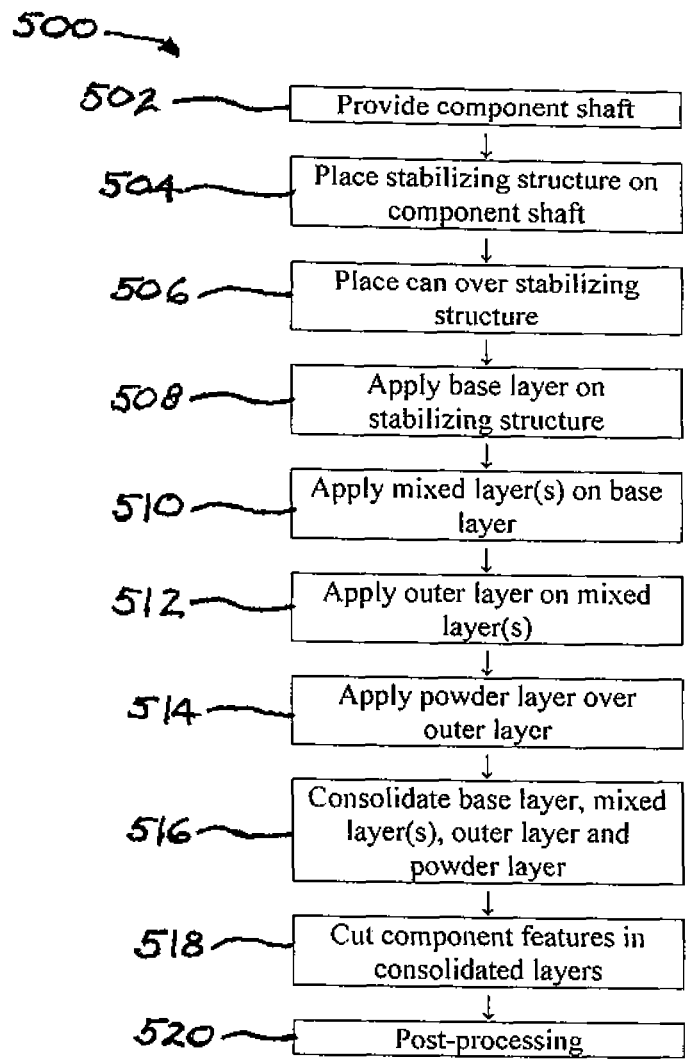
FIG. 36 is a slightly modified illustrative embodiment of the preceding methods of fabricating reduced weight components.

The methods which were heretofore described with respect to FIGS. 1-33 of the drawings illustrate non-limiting examples of reduced weight components which can be fabricated using methods of fabricating reduced weight components according to the disclosure. FIGS. 34-36, which will be hereinafter described, generally illustrate methods which can be used to fabricate a wide variety of reduced weight components according to the disclosure.

Referring next to FIG. 34 of the drawings, an illustrative embodiment of the methods of fabricating, reduced weight components is generally indicated by reference numeral 300. The method 300 may be used to fabricate components which generally have a central bore or opening that may accommodate a shaft on which the component is mounted, for example and without limitation. Non-limiting examples of components which can be fabricated according to the method 300 include gears such as ring gears, spur gears, pinion gears, worm gears and planetary ring gears or flywheels.

At block 302, a sacrificial component blank having a blank surface is provided. In some embodiments, the sacrificial component blank may include steel, for example and without limitation. At block 304, a reverse image of component features is undercut in the blank surface of the sacrificial component blank. At block 306, an outer layer may be applied to the undercut blank surface. The outer layer may include a relatively heavyweight material or a mixture having the relatively heavyweight material and at least one relatively lightweight material of which the component body or core will be made, with a higher proportion of the relatively heavyweight material than the relatively lightweight material. In some embodiments, the outer layer may include steel, a mixture of steel and titanium, for example and without limitation.

At block 308, at least one mixed layer is applied over the outer layer. The mixed layer may include a mixture having the relatively heavyweight material of which the final contact surfaces (the outer layer) of the component will be made (typically steel or steel alloy) and at least one relatively lightweight material of which the component core will be made (typically titanium). The mixed layers may have progressively higher proportions of the relatively heavyweight material relative to the relatively lightweight material. Successive mixed layers may have gradually progressively higher proportions of the relatively lightweight material than preceding mixed layers which are closer to the outer layer. In some embodiments, the mixed layer may include hybrid particles each having a particle core and a particle coating on the particle core, as was heretofore described with respect to FIG. 11C.

At block 310, a base layer may be applied over the mixed layer or layers. The base layer may include the relatively lightweight material of which the component core will be made without the relatively heavyweight material. In some embodiments, the base layer may include titanium, for example and without limitation. The outer layer, the mixed layer(s) and the base layer may be loosely applied sequentially by thermal spraying or other techniques which are known by those skilled in the art and suitable for the purpose.

At block 312, a can may be positioned over the base layer. In some embodiments, the can may be thermally sprayed over the base layer and consolidated using mechanical forces or impacting according to the knowledge of those skilled in the art. At block 314, a powder layer may be applied over the base layer. The powder layer may include the relatively lightweight material which will form the component core. In some embodiments, the powder layer may include a titanium/aluminum/vanadium alloy, for example and without limitation. The powder layer may be applied by loose thermal spraying or other techniques which are known by those skilled in the art and suitable for the purpose.

At block 316, the can may be hermetically sealed. At block 318, a component, core may be formed by consolidating the powder layer. In some embodiments, consolidation of the powder layer to form the component core may be carried out using HIP (Hot Isostatic Press) processing. In other embodiments. consolidation of the powder layer may be carried out using alternative processes which, are known by those skilled in the art and suitable for the purpose. At block 320, the sacrificial component blank may be cut away from the base layer. The outer layer which was applied at block 306 forms the contact surface of the component. At block 322, post-processing may be carried out. Post-processing may include heat treatment quenching and machining or grinding of precise dimensions of the component features according to the knowledge of those skilled in the art. The relatively lightweight material composition of the component core dramatically reduces the weight of the component, whereas the relatively heavyweight material composition of the now exposed outer layer on the component features enhances the wear resistance characteristics of the component features.

Referring next to FIG. 35 of the drawings, a flow diagram of a slightly modified illustrative embodiment of the methods of fabricating reduced weight components is generally indicated by reference numeral 400. The method 400 may be used to fabricate solid components which generally lack a central bore or other opening. Non-limiting, examples of components which can be fabricated according to the method 400 include U-joints, roller bearings, races, fasteners, camshafts, crankshafts, linkages, connectors, splined shafts, suspension components, couplings, engine valve components, pump components and shafts.

At block 402, a component core having a core surface is provided. The component core may include a relatively lightweight material such as titanium, for example and without limitation. At block 404, component features may be undercut in the core surface of the component core. At block 406, a base layer may be applied over the undercut blank surface. The base layer may include a mixture having the relatively lightweight material of which the component core is made and at least one relatively heavyweight material of which the final layer of the component features will be made, with a higher proportion of the relatively lightweight material than the relatively heavyweight material. In some embodiments, the base layer may include a mixture of a relatively lightweight material such as titanium and a relatively heavyweight material such as steel, for example and without limitation.

At block 408, at least one mixed layer is applied over the base layer. The mixed layer may include a mixture having the relatively lightweight material which the component core is made and at least one relatively heavyweight material of which the component surface will be made. One or more of the mixed layers closest to the base layer may have a higher proportion of the relatively lightweight material than the relatively heavyweight material. Successive mixed layers may have gradually progressively higher proportions of the relatively heavyweight material than preceding mixed layers which are closer to the base layer. In some embodiments, the mixed layer may include hybrid particles each having a particle core and a particle coating on the particle core, as was heretofore described with respect to FIG. 11C.

At block 410, an layer may be applied over the mixed layer or layers. The outer layer may include the relatively heavyweight material without the relatively lightweight material. In some embodiments, the outer layer may include steel, for example and without limitation. The base layer, the mixed layer(s) and the outer layer may be applied by loose thermal spraying or other techniques which are known by those skilled in the art and suitable for the purpose.

At block 412, a can may be positioned over the outer layer and hermetically sealed. In some embodiments, the can may be thermally sprayed and consolidated using mechanical forces or impacting according to the knowledge of those skilled in the art. At block 414, the base layer. the mixed layer(s) and the outer layer may be consolidated. In some embodiments, consolidation of the layers may be carried out using HIP (Hot Isostatic Press) processing. In other embodiments, consolidation of the layers may be carried out using alternative processes which are known by those skilled in the art and suitable for the purpose. At block 416, post-processing may be carried out. Post-processing may include heat treatment quenching and machining or grinding of precise dimensions of the component features according to the knowledge of those skilled in the art. The relatively lightweight material composition of the component dramatically reduces the weight of the component, whereas the relatively heavyweight material composition of the outer layer on the component features enhances the wear resistance characteristics of the component features.

Referring next to FIG. 36 of the drawings, a flow diagram of a slight modification of an illustrative embodiment of the methods of fabricating reduced weight components is generally indicated by reference numeral 500. The method 500 may be used to fabricate solid components which generally lack a central bore or other opening and require a stabilizing structure to stabilize or reduce elastic bending of component features such as gear teeth or splines, for example, and without limitation.

At block 502, a component shaft is provided. The component shaft may include a relatively lightweight material such as titanium, for example and without limitation. At block 504, a stabilizing structure is placed on the component shaft. The stabilizing structure may include a relatively heavyweight material which is characterized by structural rigidity such as steel or steel alloy, for example and without limitation. At block 506, a can may be placed over the stabilizing structure. In some embodiments, the can may be thermally sprayed and consolidated using mechanical forces or impacting according to the knowledge of those skilled in the art. At block 508, a base layer may be applied over the stabilizing structure and the component shaft. The base layer may include a mixture having a relatively lightweight material and at least one relatively heavyweight material of which the final layer of the component features will be made, with a higher proportion of the relatively lightweight material than the relatively heavyweight material. In some embodiments, the base layer may include a mixture of a relatively lightweight material such as titanium and a relatively heavyweight material such as steel, for example and without limitation with a higher proportion of the relatively lightweight material.

At block 510, at least one mixed layer is applied over the base layer. The mixed layer may include a mixture having the relatively lightweight material of which the component blank is made and at least one relatively heavyweight material of which the outer layer on the component features will be made. One or more of the mixed layers closest to the base layer may have a higher proportion of the relatively lightweight material than the relatively heavyweight material, with a higher proportion of the relatively heavyweight material than is provided in the base layer. Successive mixed layers may have gradually progressively higher proportions of the relatively heavyweight material than preceding mixed layers which are closer to the base layer. In some embodiments, the mixed layer may include hybrid particles each having a particle core and a particle coating on the particle core, as was heretofore described with respect to FIG. 11C.

At block 512, an outer layer may be applied over the mixed layer or layers. The outer layer may include the relatively heavyweight material without the relatively lightweight material. in some embodiments, the outer layer may include steel, for example and without limitation. The base layer, the mixed layer(s) and the outer layer may be applied by loose thermal spraying or other techniques which are known by those skilled in the art and suitable for the purpose.

At block 514, a powder layer may be applied over the outer layer. The powder layer may include the relatively heavyweight material of which the outer layer 512 is made. At block 516, the base layer, the mixed layer(s), the outer layer and the powdered layer may be consolidated. In some embodiments, consolidation of the layers may be carried out using HIP (Hot Isostatic Press) processing. In other embodiments, consolidation of the layers may be carried out using alternative processes which are known by those skilled in the art and suitable to the purpose. At block 518, the component features may be cut in the consolidated powder layer and outer layer with the outer layer remaining in place over the component features. At block 520, post-processing may be carried out. Post-processing may include heat treatment quenching and machining or grinding of precise dimensions of the component features according to the knowledge of those skilled in the art. The relatively lightweight material composition of the component dramatically reduces the weight of the component, whereas the relatively heavyweight material composition of the outer layer on the component features enhances the wear resistance characteristics of the component features.

While illustrative embodiments of the disclosure have been described above, it will be recognized and understood that various modifications can be made and the appended claims are intended to cover all such modifications which may fall within the spirit and scope of the disclosure.

What is claimed is:

1. A method of fabricating a reduced weight component for an apparatus, comprising:
   obtaining a component including a relatively lightweight material;
   placing at least one stabilizing structure on the component;
   sequentially applying a plurality of applied layers on the component and the stabilizing structure by applying the relatively lightweight material as sprayed powder panicles over the component and the stabilizing structure and applying over the relatively lightweight material a gradient mixture as sprayed powder particles having increasing proportions of a relatively heavyweight material and decreasing proportions of the relatively lightweight material from the component and the at least one stabilizing structure to an outer layer, and applying the outer layer as sprayed powder particles with a higher proportion of the relatively heavyweight material than the relatively lightweight material over the gradient mixture;
   diffusion bonding the plurality of applied layers by consolidation of the plurality of applied layers; and,
   cutting component features in the plurality of applied layers.

2. The method of claim 1 wherein obtaining the component including the relatively lightweight material comprises obtaining a component shaft including the relatively lightweight material.

3. The method of claim 2 wherein the stabilizing structure comprises at least one stabilizing disk having a disk body, a shaft opening in the disk body and a plurality of disk teeth on the disk body on the component shaft.

4. The method of claim 3 wherein the stabilizing structure comprises a pair of stabilizing disks on the component shaft in spaced-apart relationship to each other.

5. A method of fabricating a reduced weight component for an apparatus, comprising:
   obtaining a component including a relatively lightweight material;
   placing at least one stabilizing structure on the component;
   sequentially applying a plurality of applied layers on the component and the stabilizing structure by applying the relatively lightweight material over the component and applying over the relatively lightweight material a plurality of layers having gradually progressively higher proportions of a relatively heavyweight material than preceding ones of the plurality of layers closer to the component, with an outer layer of the plurality of applied layers including the relatively heavyweight material;
   diffusion bonding the plurality of applied layers by consolidation of the plurality of applied layers;
   cutting component features in the plurality of applied lavers;
   wherein applying the relatively lightweight material over the component comprises applying a mixture having titanium and steel over the component; and
   wherein sequentially applying a plurality of applied layers on the component and the stabilizing structure comprises applying a gradient mixture having increasing proportions of steel and decreasing proportions of titanium from the relatively lightweight material to the outer layer, and applying the outer layer with a higher proportion of steel than titanium over the gradient mixture.

6. A method of fabricating a reduced weight component for an apparatus, comprising:
   obtaining a component including relatively lightweight material;
   placing at least one stabilizing structure on the component;
   sequentially applying a plurality of applied layers on the component and the stabilizing structure by applying the relatively lightweight material over the component and applying over the relatively lightweight material a plurality of layers having gradually progressively higher proportions of a relatively heavyweight material than preceding ones of the plurality of layers closer to the component, with an outer layer of the plurality of applied layers including the relatively heavyweight material;
   diffusion bonding the plurality of applied layers by consolidation of the plurality of applied layers;
   cutting component features in the plurality of applied layers; and
   wherein sequentially applying a plurality of applied layers on the component and the stabilizing structure comprises forming at least one mixed layer including a plurality of hybrid particles on the component and the stabilizing structure, each of the plurality of hybrid particles having a particle core and a particle coating on the particle core.

7. The method of claim 6 wherein forming at least one mixed layer including a plurality of hybrid particles on the component and the stabilizing structure comprises forming at least one, mixed layer including a plurality of hybrid particles each haying a particle core including steel and a particle coating selected from the group consisting of niobium, Vanadium, Rhenium and combinations thereof on the component and the stabilizing structure.

8. A method of fabricating reduced weight components for an apparatus, comprising;
   obtaining a component shaft including a relatively lightweight material;
   placing a stabilizing structure on the component shaft;
   placing a can over the stabilizing structure;
   forming a base layer including a mixture having the relatively lightweight material and a relatively heavyweight material heavier in weight than the relatively lightweight material on the component shaft and the stabilizing structure, the base layer having a higher proportion of the relatively lightweight material than the relatively heavyweight material;
   forming at least one mixed layer including a mixture of the relatively lightweight material and the relatively heavyweight material on the base layer, the at least one mixed layer having a higher proportion of the relatively heavyweight material than the base layer;

forming an outer layer including the relatively heavyweight material on the at least one mixed layer;

diffusion bonding the base layer, the at least one mixed layer and the outer layer by consolidation of the layers; and cutting component features in the base layer, the at least one mixed layer and the outer layer.

9. The method of claim 8 wherein the stabilizing structure comprises at least one stabilizing disk on the component shaft.

10. The method of claim 9 wherein a the stabilizing structure comprises at least one stabilizing disk having a disk body, a shaft opening in the disk body and a plurality of disk teeth on the disk body on the component shaft.

11. The method of claim 9 wherein the stabilizing structure comprises a pair of stabilizing disks on the component shaft in spaced-apart relationship to each other.

12. The method of claim 8 wherein forming a base layer comprises forming a base layer including a mixture having titanium and steel on the component shaft.

13. The method of claim 8 wherein forming the at least one mixed layer on the base layer comprises loosely spraying particulate mixed layer material on the base layer using thermal spraying.

14. The method of claim 8 wherein consolidation of the base layer, the at least one mixed layer and the outer layer comprises subjection of the base layer, the at least one mixed layer and the outer layer to Hot Isostatic Press processing.

15. A method of fabricating reduced weight components for an apparatus, comprising:

obtaining a component shaft including a relatively lightweight material;

placing a stabilizing structure including a pair of stabilizing disks in spaced-apart relationship to each other on the component shaft, the stabilizing structure having a relatively heavyweight material with a higher weight and torsional resistance than a weight and torsional resistance of the relatively lightweight material;

placing a can over the stabilizing structure;

forming a base layer including a mixture having the relatively lightweight material and the relatively heavyweight material on the component shaft and the stabilizing structure, the base layer having a higher proportion of the relatively lightweight material than the relatively heavyweight material;

forming a plurality of mixed layers including a mixture of the relatively lightweight material and the relatively heavyweight material on the base layer, the plurality of mixed layers having progressively higher proportions of the relatively heavyweight material from the base layer through the plurality of mixed layers;

forming an outer layer including the relatively heavyweight material on the plurality of mixed layers;

diffusion bonding the base layer, the plurality of mixed layers and the outer layer by consolidation of the layers; and cutting component features in the base layer, the plurality of mixed layers and the outer layer.

16. The method of claim 15 wherein the stabilizing structure comprises a pair of stabilizing disks each having a disk body, a shaft opening in the disk body and a plurality of disk teeth on the disk body on the component shaft.

17. The method of claim 15 wherein forming a base layer comprises forming a base layer including a mixture having titanium and steel on the component shaft.

18. The method of claim 15 wherein forming the at least one mixed layer on the base layer comprises loosely spraying particulate mixed layer material on the base layer using thermal spraying.

19. The method of claim 15 wherein consolidation of the base layer, the at least one mixed layer and the outer layer comprises subjection of the base layer, the at least one mixed layer and the outer layer to Hot Isostatic Press processing.

* * * * *